Patented Sept. 13, 1949

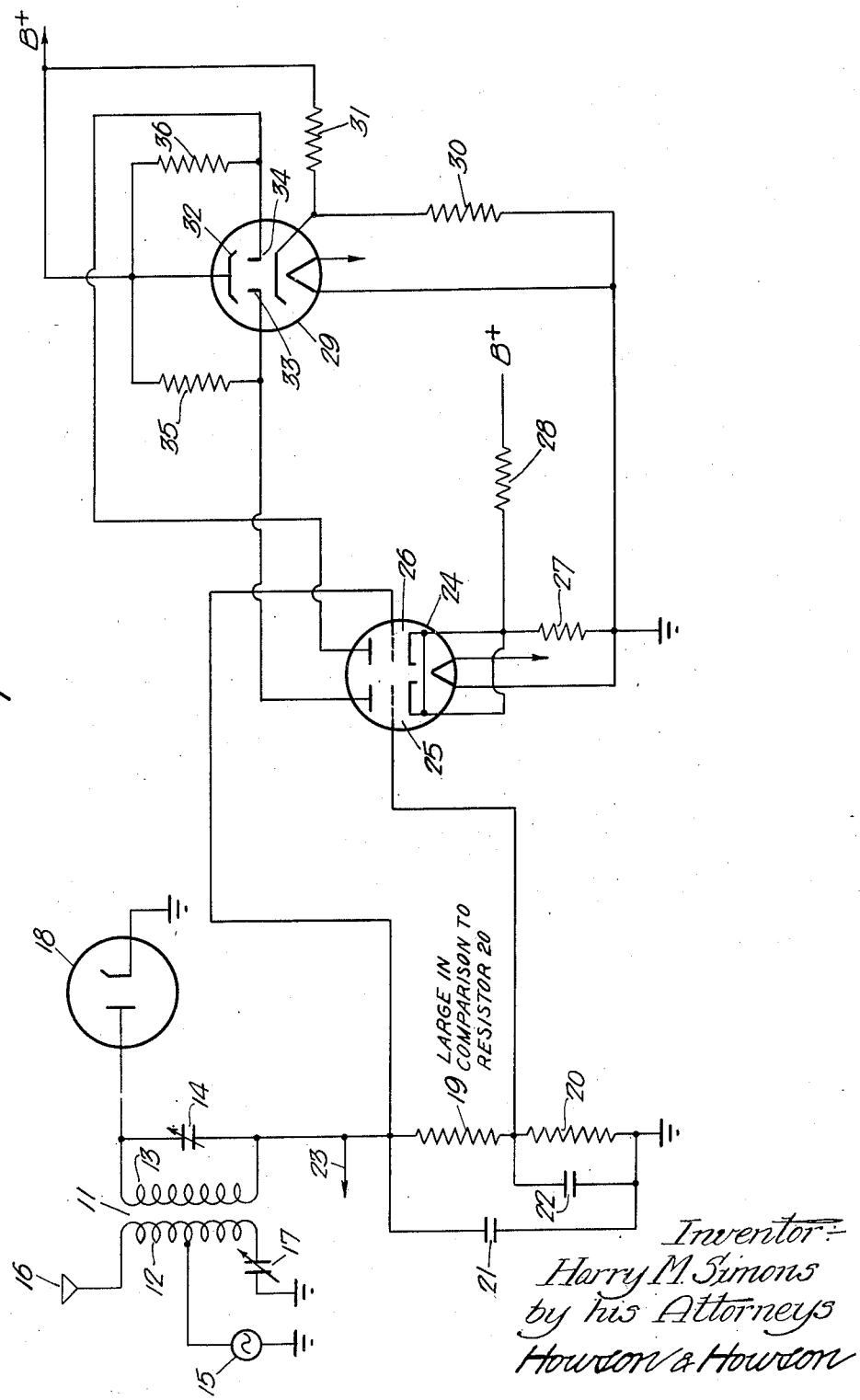

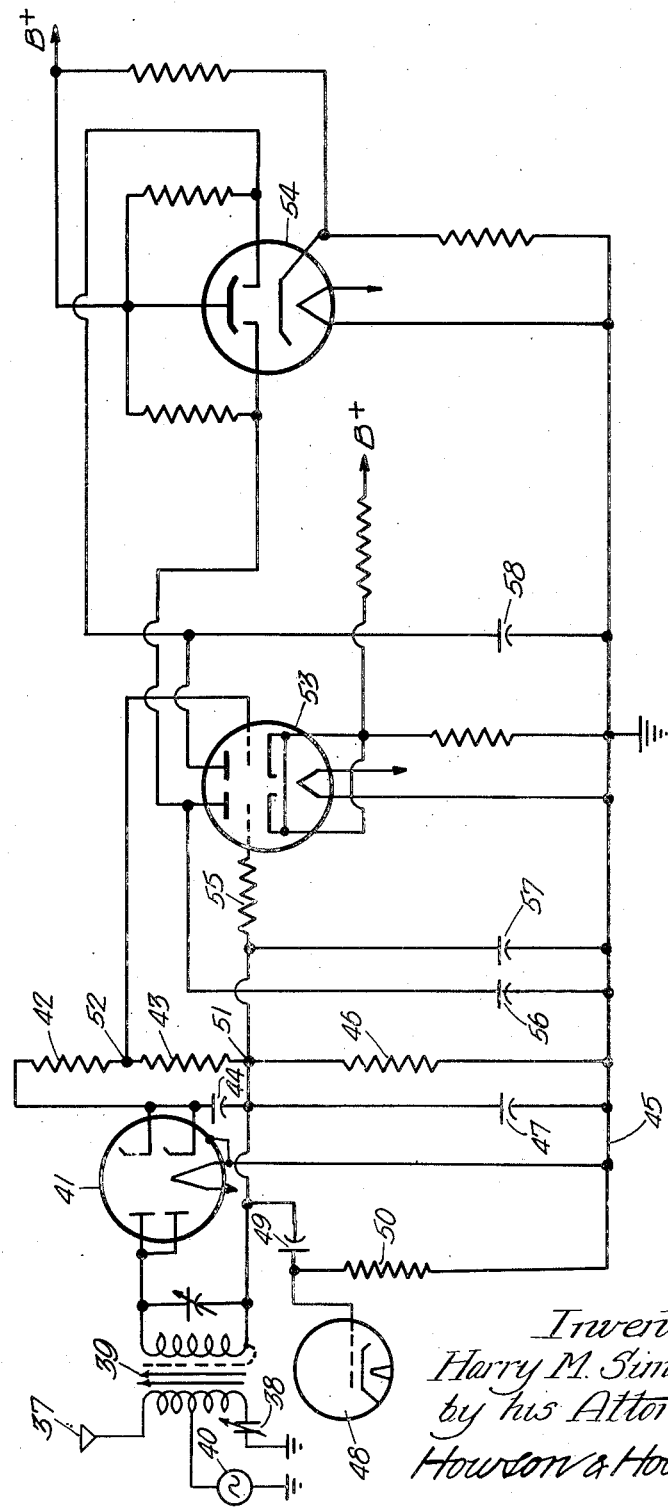

2,481,954

UNITED STATES PATENT OFFICE 2,481,954

INDICATOR CIRCUIT FOR A BALANCING NETWORK

Harry M. Simons, Langhorne, Pa., assignor to Gage B. Ellis, Langhorne, Pa.

Application January 4, 1946, Serial No. 639,122

1 Claim. (Cl. 177—311)

This invention relates to electrical systems wherein it is desired to produce a normal condition of balance or unbalance and wherein a voltage is produced or varied in response to disturbance of said condition. The invention is directed particularly to capacity-responsive systems wherein capacities are opposed to one another and a voltage is produced or varied in response to a capacity change. An example of such a system is an alarm system which is adapted to produce a signal to indicate the presence of a person in a certain area.

In my copending application, Serial No. 639,-123, filed January 4, 1946, there is disclosed a capacity-responsive system which is adapted to provide different sensitivities for different usages, and which enables accurate adjustment to a condition of exact balance or slight unbalance. In using such a system, it is necessary to have some means for accurately indicating the condition of adjustment. The present invention provides an indicating circuit which is particularly adapted for use with such a system.

The principal object of the present invention is to provide an indicating circuit which will enable easy and accurate adjustment of a system of the above-mentioned character.

Another object of the invention is to provide such an indicating circuit by means of which it is possible to establish coarse and fine adjustment to the end that a desired condition of exact balance or predetermined unbalance may be readily attained.

A further object of the invention is to provide an indicating circuit of this character which utilizes indicating means in the form of a twin-indicator tube.

Other objects and features of the invention will be apparent from the following detailed description with reference to the accompanying drawings.

Since the invention is intended primarily for use in conjunction with a capacity-responsive system, it will be described with reference thereto. However, it is to be understood that the invention is applicable to any electrical system where it is desired to establish a normal condition of balance or unbalance, and to produce or vary a voltage in response to disturbance of the normal condition.

In the accompanying drawings,

Fig. 1 is a schematic diagram of one form of indicator circuit constructed according to the invention; and Fig. 2 is a schematic diagram of a preferred form of the circuit.

Referring to Fig. 1, there is shown a high frequency transformer 11 having a center-tapped primary winding 12 and a secondary winding 13, the latter preferably being tuned to the desired operating frequency by means of the adjustable shunt condenser 14. A source of high frequency oscillations 15 is connected between the center tap of the primary winding 12 and ground. The said source may take any convenient form such as a conventional oscillator adapted to operate at some high frequency, e. g. 150 kc. An antenna 16, having a certain capacity to ground, is connected to the upper end of the primary winding 12, while an adjustable condenser 17 is connected between the lower end of said winding and ground. By adjusting the condenser 17, a condition of balance or predetermined unbalance may be obtained. Any disturbance of such condition, due to variation of the antenna capacity, will produce a voltage or voltage variation in the secondary winding 13.

The arrangement thus far described is intended merely to be symbolic or representative of a balance-type capacity-responsive system, such as that disclosed in the above-mentioned application. The present invention is directed to the provision of a novel indicator circuit for use with such a system.

Any voltage which appears across the secondary winding 13 is rectified in order to obtain a unidirectional voltage. The rectifying means may comprise a diode rectifier 18 and associated load resistors 19 and 20 and shunt condensers 21 and 22. An output voltage for operating some device, such as an alarm device, may be derived from across the load resistors by way of the connection 23. Resistor 19 is large in comparison to resistor 20, so that the voltage across resistor 20 is a small fraction of the total voltage across both resistors. For example, resistor 19 may have a value of one megohm while resistor 20 may have a value of 10,000 ohms, so that the voltage across resistor 20 is only about one percent of the total voltage. Two different voltages, which are utilized to effect coarse and fine balancing of the system, are derived from the resistors and are applied to the control grids of a twin-triode amplifier tube 24 having triode sections 25 and 26. It will be noted that the lower voltage derived from resistor 20 is applied to the grid triode section 25, while the higher voltage derived from both resistors is applied to the grid of triode section 26. The tube 24 is biased to provide a predetermined normal plate current flow in each triode section by means of a cathode bias arrangement in the form of a voltage divider comprising resistors 27 and 28. The latter resistor is connected to the B+ supply source, as indicated. It will be apparent that the voltage appearing across resistor 27 biases the cathodes of tube 24 positively to the desired extent with respect to ground.

The anodes or plates of the twin triode tube 24 are connected respectively to the control electrodes of a twin-indicator electron tube 29, whose cathode is biased by means of a voltage divider comprising resistors 30 and 31 in substantially the same manner as the cathodes of tube 24 are biased. The twin-indicator tube 29 is a well known device, and only such description thereof as is necessary to describe the present invention will be required herein. The tube 29 has a fluorescent target 32 which is connected to the B+ source, as indicated. The control electrodes 33 and 34 serve to create and vary sectors of darkness, or shadows, on the fluorescent target. The enlargement and diminution of the shadow area in such a tube are commonly termed "opening" and "closing" of the shadow. It will be seen that the plate of the triode section 25 of tube 24 is connected to the control electrode 33, while the plate of triode section 26 is connected to the control electrode 34. The plate of triode 25 and the control electrode 33 are connected to the B+ supply through a resistor 35, and similarly the plate of triode 26 and the control electrode 34 are connected to the B+ supply through a resistor 36.

In the absence of any voltage across the load resistors 19 and 20, the electron current flow in each of the tubes 24 and 29 will be constant. In tube 29, the electrons will strike the target 32 except for the sectors in the regions of the control electrodes 33 and 34, which are at lower potential than the target because of the voltage drop in each of the resistors 35 and 36.

When a voltage appears across the load resistors 19 and 20, the two derived voltages serve to change the current flow in the triodes 25 and 26 by different amounts, and the voltage drop in each of the resistors 35 and 36 is changed accordingly. Consequently the target areas affected by the control electrodes 33 and 34 are caused to vary, and these variations are utilized in establishing the desired condition of adjustment.

Since the voltage across resistor 20 is only a small fraction or percentage of the voltage across both resistors 19 and 20, a given variation of the total voltage which produces a certain change of plate current in triode 26 will product a much smaller change of plate current in triode 25. Consequently the target areas of tube 29 will be correspondingly varied and the visible variations may be utilized to effect coarse and fine adjustments. Thus the visible effect produced by control electrode 34 in tube 29 is used during coarse adjustment while the visible effect produced by control electrode 33 is used during fine adjustment.

In adjusting the system, the condenser 17 is adjusted toward a balanced condition, while observing the coarse target area of tube 29, until an approximate or coarse balance is indicated. The condenser 17 is then further adjusted, while observing the fine target area of tube 29, to obtain a desired condition of balance or unbalance. In this manner, the desired condition may be quickly attained with great accuracy. The dual adjustment is analogous to the coarse and vernier adjustments of various known precision instruments.

Referring now to Fig. 2, there is shown a preferred form of the circuit which has been employed in practice. The antenna 37, adjustable condenser 38, transformer 39 and high frequency source 40 correspond to the similar elements in Fig. 1, but the transformer 39 is of the adjustable core type to facilitate tuning. The rectifier comprises a diode 41, preferably a 6H6 tube, having associated load resistors 42 and 43 and shunt condenser 44. The heater element of the diode is connected to the grounded conductor 45. A resistor 46 is connected between the lower end of the load resistor 43 and the grounded conductor 45. A condenser 47 is connected in shunt with the resistor 46.

An output voltage is derived from resistor 46 and its associated condenser 47, and is applied to an amplifier tube 48 by way of a coupling condenser 49 and resistor 50. The tube 48 constitutes a part of the apparatus which is to be actuated in response to a variation in the capacity of antenna 37.

The two voltages which are derived in accordance with the present invention are taken from points 51 and 52. While resistor 46 and condenser 47 are not directly in the load circuit of the diode 41, use of the circuit has shown that a useful fractional voltage appears across these elements. This may be due to a leakage current within the diode, but whatever the reason, it has been found that a voltage appears across resistor 46 and condenser 47 which is especially suitable for fine adjustment.

As before, the two derived voltages are supplied to the grids of a twin-triode tube 53, preferably a 6SL7 tube, which is connected to a twin indicator tube 54. The latter may be a 6AF6G tube. Except for the provision of certain filtering elements, the portion of the circuit comprising tubes 53 and 54 is similar to the circuit of Fig. 1. The additional filter elements are resistor 55 and condensers 56, 57 and 58.

The circuit of Fig. 2 has been found to operate in a peculiar but highly desirable manner. When the system is substantially unbalanced, the coarse shadow is open and the fine shadow is closed. As the system is adjusted toward the balance point, the coarse shadow closes and opens repeatedly with a time delay until an approximate or coarse balance is reached. When an exact balance is reached, the fine shadow opens.

With a condition of adjustment such that the fine shadow is slightly closed, the direction of unbalance can readily be determined by placing the fingers near the transformer coil and observing the shadow. Slight closing of the shadow will indicate unbalance in one direction while slight opening of the shadow will indicate unbalance in the other direction.

In a specific embodiment of the circuit shown in Fig. 2, resistor 42 had a value of 100,000 ohms, resistors 43 and 46 each had a value of one megohm, and condensers 44 and 47 had values of .001 micro-microfarad and .25 micro-microfarad, respectively.

While it is preferred to use a double triode and a twin-indicator tube, as shown in the illustrated embodiments, two single triodes and two single indicator tubes could be employed.

Although the invention has been described with reference to the specific circuits illustrated,

I claim:

In an electrical system wherein it is desired to produce a condition of balance or predetermined unbalance, a balancing transformer across whose secondary winding a voltage is produced in response to an unbalanced condition, a diode rectifier and a load circuit therefor connected to said secondary winding, said diode having a heater element, a grounded conductor, means connecting said heater element to said conductor, a resistor and shunt condenser connected between said load circuit and said conductor, means for deriving a voltage from said load circuit, means for deriving a second voltage of different magnitude from said resistor and shunt condenser, a twin-indicator tube, and means for utilizing said derived voltages to actuate said indicator tube.

HARRY M. SIMONS.

REFERENCES CITED

The following references are of record in the file of this patent:

UNITED STATES PATENTS

| Number | Name | Date |
|---|---|---|
| 1,406,500 | Schneider | Feb. 14, 1922 |
| 1,823,739 | Horton | Sept. 15, 1931 |
| 2,263,932 | Schnoll | Nov. 25, 1941 |
| 2,278,516 | Gulliksen | Apr. 7, 1942 |